United States Patent [19]

Carlick et al.

[11] 4,385,166

[45] May 24, 1983

[54] PRINTING INKS BASED ON POLY(AMIDE-ESTER) RESINS

[75] Inventors: Daniel J. Carlick, Livingston; Arnold H. Gruben, Cedar Grove; Shih-chung Chen, Verona, all of N.J.

[73] Assignee: Sun Chemical Corporation, New York, N.Y.

[21] Appl. No.: 319,641

[22] Filed: Nov. 9, 1981

Related U.S. Application Data

[63] Continuation-in-part of Ser. No. 132,973, Mar. 24, 1980.

[51] Int. Cl.$^3$ ............................................. C08G 59/06
[52] U.S. Cl. .................... 528/111.3; 524/606; 525/481; 525/488; 523/400; 528/107; 528/112; 528/119
[58] Field of Search ...................... 528/111.3, 112, 119, 528/107; 525/481, 488; 523/400; 524/606

[56] References Cited

U.S. PATENT DOCUMENTS

| | | | |
|---|---|---|---|
| 2,626,223 | 1/1953 | Sattler et al. | 260/18 PN |
| 2,811,495 | 10/1957 | Wittcoff et al. | 260/18 PN |
| 2,867,592 | 1/1959 | Morris et al. | 528/111.3 |
| 2,904,524 | 9/1959 | Baumgartner | 260/18 PN |
| 2,912,398 | 11/1959 | Johnson et al. | 260/18 PN |
| 3,207,653 | 9/1965 | DeLia et al. | 260/23 XA |
| 3,308,076 | 3/1967 | DeLia et al. | 260/18 PN |
| 4,086,197 | 4/1978 | Bouche et al. | 260/18 PN |
| 4,247,426 | 1/1981 | Hinze et al. | 528/111.3 |

*Primary Examiner*—Harold D. Anderson
*Attorney, Agent, or Firm*—Cynthia Berlow

[57] ABSTRACT

Novel vehicles for printing inks are thermoplastic alcohol-soluble low molecular weight poly(amide-ester) resins that are prepared by a two-step process from a dimerized fatty acid, a polyamine, and a bisphenol A-epichlorohydrin epoxy resin.

5 Claims, No Drawings

PRINTING INKS BASED ON POLY(AMIDE-ESTER) RESINS

This application is a continuation-in-part of application Ser. No. 132,973, filed on Mar. 24, 1980.

The invention relates to printing inks and coating compositions. More particularly it relates to printing inks and coating compositions having as the vehicle a novel poly(amide-ester) resin.

BACKGROUND OF THE INVENTION

The desired properties of printing inks vary with the type of ink. Flexographic and gravure inks, for example, must have gloss, adhesion to the substrate, and resistance to heat and scuffing. Heatset lithographic inks should be resistant to rubbing and scuffing. Publication gravure inks must have high gloss and scuff resistance. Water-based inks and photocurable inks also have specific needs.

Attempts are being made to develop resins that would impart to these inks the required properties. Conventional water-soluble rosin-modified maleic acid resins are commercially utilized, but they give brittle films that lack scuff resistance. Copolymers of styrene and maleic anhydride are also used, but they lack adequate adhesion to many packaging films. Conventional polamide resins have generally good overall properties, but they lack heat resistance in packaging inks and show inadequate adhesion to many polypropylene films that are growing in importance as packaging materials.

SUMMARY OF THE INVENTION

A resin that would impart to a variety of inks the required properties should be thermoplastic, alcohol-soluble, and compatible with nitrocellulose; also it must have very low acid and amine values. It has now been found that a suitable resin for printing inks and coating compositions is a thermoplastic, alcohol-soluble poly(amide-ester) resin prepared by the steps of (1) reacting a dimerized fatty acid with a diamine to form a carboxyl-terminated polyamide resin which is then (2) reacted with an epoxy resin via the terminal epoxy groups to form a poly(amide-ester) resin having secondary hydroxyl groups.

DETAILED DESCRIPTION OF THE INVENTION

A dimerized fatty acid is reacted with a polyamine in the presence of a chain-terminating agent to form a low molecular weight carboxyl-terminated polyamide resin (step 1). The carboxyl groups are then reacted with an epoxy resin via the terminal epoxy groups in the presence of a catalyst. The oxirane oxygen ring is opened, forming an ester and a pendant secondary hydroxyl group (step 2). This secondary hydroxyl group contributes to the alcohol solubility of the product and also acts as a further reaction point for crosslinking or post-reactions, if desired. The general reactions are as follows:

Step 1

Step 2

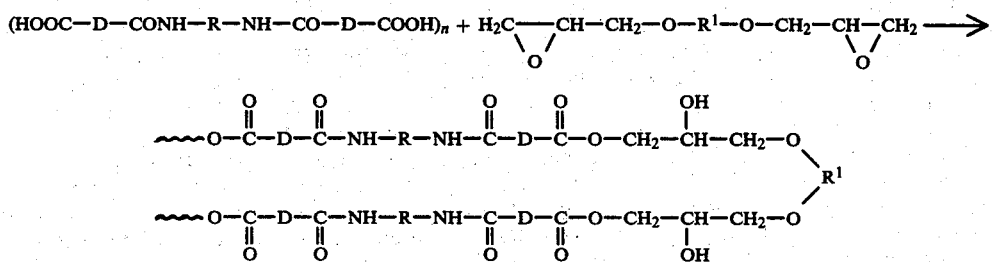

where D is an alkyl-substituted cyclohexenyl ring; R is an aliphatic chain, an aromatic nucleus, an alkyl-substituted cyclohexyl ring, or an oxypropylene repeating unit; $R^1$ is a bisphenol A moiety; and n is an integer of about 2 to 20.

The dimerized fatty acids have the general formula HOOC—D—COOH where D is an alkyl-substituted cyclohexenyl ring. They are obtainable commercially from several manufacturers and have the following approximate composition:

| | Weight % |
|---|---|
| monomer acids | trace–15 |
| dimer acids | 60–98 |
| trimer acids | trace–25 |

Typical dimerized fatty acids include, but are not limited to, the following:

| | Acids, wt. % | | |
|---|---|---|---|
| | Monomer | Dimer | Trimer |
| Crodym (Crosby Chemicals) | | | |
| T-18 | 3 | 79 | 18 |
| Empols (Emery Industries) | | | |
| 1014 | 1 | 95 | 4 |
| 1018 | trace | 83 | 17 |
| Unidyme 18 (Union Camp) | 3 | 79 | 18 |

The dimerized fatty acid is generally used in an amount between about 40 and 88 percent, and preferably between about 70 and 75 percent, based on the weight of the total charge of reactants.

The polyamine component has the general formula $H_2N$—R—$NH_2$ where R represents an aliphatic chain, an aromatic nucleus, an alkyl-substituted cyclohexyl ring, or an oxypropylene repeating unit. Typical examples include ethylenediamine, propylenediamine, hexamethylenediamine, isophoronediamine, and polyglycoldiamine. In addition to the diamine, a small amount of a triamine, such as diethylenetriamine, or a polyamine, such as triethylenetetramine or tetraethylenepentamine, can be used, depending upon the functionality of the acid component. It is used in an amount between about 5 and 10 percent, and preferably between about 6 and 9 percent, based on the weight of the total charge of reactants. A proportion of mono-amines such as n-butyl amine can also be employed to increase solubility in alcohol and compatibility with other resinous materials.

The epoxy resin component has the general formula

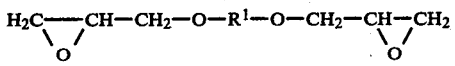

where $R^1$ is a bisphenol A moiety. Typical bisphenol A-epichlorohydrin resins include Shell's Epons, e.g., Epon 812 (epoxide equivalent of 150 to 170), Epon 828 (epoxide equivalent of 180 to 195), Epon 1001 (epoxide equivalent of 425 to 550), and Epon 1004 (epoxide equivalent of 875 to 1025), and Dow's DER 331 (epoxide equivalent of 182 to 190) and DER 383 (epoxide equivalent of 178 to 186). In general the epoxy resin is used in an amount of about 5 to 50 percent, and preferably about 10 to 20 percent, based on the weight of the total charge of reactants. In addition a small amount of a monoepoxide, such as an aliphatic glycidyl ether containing $C_8$–$C_{14}$ alkyl groups, can be used.

In step 1 of the process a chain-terminating agent is usually used to control the molecular weight of the product, thus improving the solubility of the product in alcohols, such as ethanol, n-propanol, or isopropanol. Suitable agents are monocarboxylic acids such as acetic acid; propionic acid; and acids having about 3 to 18 carbon atoms in the chain. The agent is used in an amount between about 2 and 10 percent, and preferably between about 4 and 6 percent, based on the weight of the total charge of reactants.

The precursor, that is, the product of step 1, should have a low molecular weight, preferably less than 3000 by end-group analysis; its acid value should be between about 35 and 200, and preferably between about 50 and 125; and its amine value should be between about 0 and 10, and preferably between about 0 and 6.

In step 2 of the process a catalyst is used to achieve a high esterification rate and to accelerate the opening of the oxirane ring. Typical catalysts include tertiary amines such as N,N-dimethylbenzylamine or tri-n-butylamine; rare earth oxides such as cerium oxide or lanthanum oxide; and transition metal salts such as chromium acetate or zirconium octoate.

The temperature employed in step 1 may range from about 150° to 225° C., and preferably from about 175° to 200° C. In step 2 it is generally between about 100° and 150° C., and preferably between about 115° and 140° C.

The product poly(amide-ester) resins are tough and yet flexible. They have acid values of about 0 to 30, and preferably about 0 to 15 mg. KOH/gm. resin; amine values of about 0 to 5, and preferably about 0 to 3 mg. KOH/gm. resin; and softening points between about 85° and 160° C., and preferably between about 85° and 135° C. They are thermoplastic; soluble in low molecular weight alcohols, such as ethanol, isopropanol, n-propanol, and blends of alcohols with hydrocarbon or ester solvents; and have a useful compatibility range with nitrocellulose.

Printing inks having excellent adhesion to difficult plastic and metallic surfaces, high heat resistance, and crosslinking potential are possible when these poly(amide-esters) are included in the formulations. For example, when used as the vehicle in flexographic or gravure inks, the resinous products of this invention impart improved gloss, adhesion, scuff resistance, and heat resistance. When they are reacted with limed rosin for publication gravure inks, high gloss and scuff resistance result.

Because these resinous products contain secondary hydroxyl groups (generated by ring-opening of the epoxy groups), they can ester-interchange with other suitable resins, such as alkyds or polyesters, to enhance the adhesion, gloss, and scuff resistance of the end product.

They also are potential vehicles for water-based inks. By reacting the hydroxyl groups with an anhydride, water solubility or water dispersibility can be obtained through salt formation by neutralizing with an organic base the free carboxyl groups (formed by ring-opening of the anhydride) of the product. An organic oxide, such as ethylene oxide, can also be added to achieve water solubility.

The poly(amide-ester) resins of this invention can also be used as ultraviolet-reactive vehicles or as additive resins for ultraviolet applications. Their hydroxyl groups can react with polyisocyanates and hydroxyl acrylates, resulting in urethanated-acrylated amide-esters.

The invention is illustrated by the following examples in which all parts and percentages are by weight unless otherwise specified.

EXAMPLE 1

(A) Into a one-liter four-necked Pyrex flask equipped with an agitator, a moisture trap, a nitrogen inlet tube, and a water-cooled condenser were charged 395.5 parts of dimerized fatty acid (Crosby Chemicals' Crodym T-18). 24.8 parts of propionic acid (99% purity), and 3 drops of an antifoam agent (Dow Corning's DC-200 silicone fluid). The reactants were heated under nitrogen to 50° C., and 25.3 parts of ethylenediamine (99% purity) was added. The exotherm raised the temperature to 100° C.; the temperature then was brought to 100°–120° C. and held for one hour. The resultant polymeric salt was dehydrated and water was distilled off at 140°–200° C. to obtain an acid-terminated polyamide resin having an acid value of 100–110 and an amine value of 0.1.

(B) The product of part (A) was cooled to 120°–130° C., and 155.0 parts of a bisphenol A-epichlorohydrin resin (Shell's Epon 828) and 0.6 part of N,N-dimethylbenzylamine were added. The reaction was held at 120°–140° C. until the acid value of the product was less than 10.

The product was an amber-colored, tough, low molecular weight poly(amide-ester) resin, somewhat rubbery at room temperature, having these properties:

| | |
|---|---|
| acid value | 7.3 |
| amine value | 0 |
| Duran's softening point, °C. | 98 |
| Gardner viscosity 25° C. @ 40% solids in n-propanol | G |

EXAMPLE 2

(A) Into a one-liter four-necked Pyrex flask equipped with an agitator, a moisture trap, a nitrogen inlet tube, and a water-cooled condenser were charged 472.0 parts of a dimerized fatty acid (Crodym T-18), 29.6 parts of propionic acid (99% purity), and 5 drops of antifoam agent (DC-200). The reactants were heated under nitrogen to 50° C., and 42.2 parts of ethylenediamine (99% purity) was added. The temperature was raised by exotherm to 90°–100° C.; it was then brought to 115° C. and held for one hour. The resultant polymeric salt was dehydrated and water was distilled off at 140°–200° C. to obtain an acid-terminated polyamide resin having an acid value of 60–65 and an amine value of 0.1.

(B) The product of part (A) was cooled to 130°–135° C., and 110.0 parts of a bisphenol A-epichlorohydrin resin (Epon 828) and 0.6 part of N,N-dimethylbenzylamine were added. The reaction was held at 120°–135° C. until the acid value of the product was about 10. The product was a poly(amide-ester) resin which was poured onto a tray to cool and solidify and subsequently was crushed.

The product was an amber-colored low molecular weight resin, somewhat harder and less rubbery than the product of Example 1, having these properties:

| | |
|---|---|
| acid value | 10.9 |
| amine value | 1.1 |
| Duran's softening point, °C. | 115–116 |
| Gardner viscosity 25° C. @ 40% solids in n-propanol | D+ |

EXAMPLE 3

The procedure of Example 1 was repeated with each of the following instead of Crodym T-18: Unidyme 18 (Union Camp's dimerized fatty acid) and Emery Industries' dimerized fatty acids Empol 1014 and Empol 1018. The results were comparable.

EXAMPLE 4

The procedure of Example 1 was repeated with each of the following epoxy resins instead of the bisphenol A-epichlorohydrin Epon 828: bisphenol A-type epoxy resins Epon 812, Epon 1001, and Epon 1004 (Shell) and DER 331 and DER 383 (Dow). The results were comparable.

EXAMPLE 5

The procedure of Example 1 was repeated with each of the following polyamines instead of ethylenediamine: propylenediamine, hexamethylenediamine, and isophoronediamine. The results were comparable.

EXAMPLE 6

The procedure of Example 1 was repeated with acetic acid instead of propionic acid. The results were comparable.

EXAMPLE 7

A flexographic ink was formulated from the following ingredients:

| | Parts |
|---|---|
| product of Example 1 | 14.0 |
| Lithol Rubine | 15.0 |
| nitrocellulose | 5.0 |
| polyethylene wax | 1.0 |
| ethanol | 40.0 |
| n-propyl acetate | 15.0 |
| heptane | 10.0 |

It showed high gloss, good adhesion, good scuff resistance, and good heat resistance on corona-treated polyolefin films and on papers.

EXAMPLE 8

A gravure ink was formulated from the following ingredients:

| | Parts |
|---|---|
| product of Example 2 | 14.0 |
| Lithol Rubine | 10.0 |
| nitrocellulose | 5.0 |
| polyethylene wax | 1.0 |
| ethanol | 30.0 |
| n-propyl acetate | 15.0 |
| toluene | 25.0 |

It showed high gloss, good adhesion, good scuff resistance, and good heat resistance on corona-treated polyolefin films and on papers.

EXAMPLE 9

A white flexographic ink was formulated from the following ingredients:

| | Parts |
|---|---|
| product of Example 1 | 12.8 |
| titanium dioxide | 35.0 |
| nitrocellulose | 4.3 |
| polyethylene wax | 1.0 |
| ethanol | 14.4 |
| n-propanol | 13.3 |
| n-heptane | 5.7 |
| n-propyl acetate | 8.5 |
| di-octyl phthalate | 2.0 |
| toluene | 1.4 |
| adhesion promoter | 1.4 |
| silicone oil | 0.1 |
| citric acid | 0.1 |

It showed high gloss, good adhesion, good scuff resistance, and good heat resistance on corona-treated polyolefin films and on papers.

EXAMPLE 10

A black flexographic ink was formulated from the following ingredients:

| | Parts |
|---|---|
| product of Example 1 | 15.4 |
| furnace black | 12.2 |
| nitrocellulose | 5.1 |
| polyethylene wax | 1.0 |
| ethanol | 29.7 |
| n-propanol | 17.3 |
| ethyl acetate | 10.2 |
| n-heptane | 4.0 |
| toluene | 2.0 |
| di-octyl phthalate | 1.5 |
| adhesion promoter | 1.4 |
| silicone oil | 0.1 |
| citric acid | 0.1 |

It showed high gloss, good adhesion, good scuff resistance, and good heat resistance on corona-treated polyolefin films and on papers.

EXAMPLE 11

A red flexographic ink was formulated from the following ingredients:

| | Parts |
|---|---|
| product of Example 1 | 14.8 |
| Red Lake C | 15.0 |
| nitrocellulose | 5.0 |
| polyethylene wax | 1.0 |
| ethanol | 28.7 |
| n-propanol | 16.7 |
| ethyl acetate | 9.9 |
| n-heptane | 3.9 |
| toluene | 1.9 |
| di-octyl phthalate | 1.5 |
| adhesion promoter | 1.4 |
| silicone oil | 0.1 |
| citric acid | 0.1 |

It showed high gloss, good adhesion, good scuff resistance, and good heat resistance on corona-treated polyolefin films and on papers.

What is claimed is:

1. In a printing ink that comprises a resin, a solvent, and a pigment, the improvement wherein the resin is a thermoplastic alcohol-soluble poly(amide-ester) having the following repeating unit

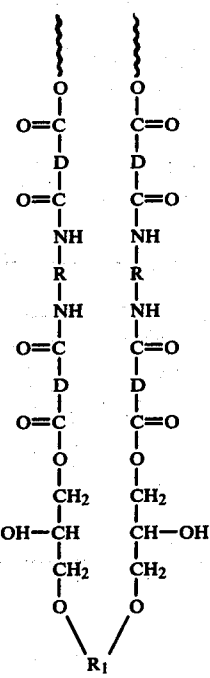

where D is an alkyl-substituted cyclohexenyl ring; R is an aliphatic chain, an aromatic nucleus, an alkyl-substituted cyclohexyl ring, or an oxypropylene repeating unit; and $R^1$ is a bisphenol A moiety having the structure

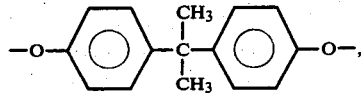

said resin having an acid value of about 0 to 30, an amine value of about 0 to 5, and a softening point of about 85° to 160° C.

2. The ink of claim 1 wherein the resin is prepared by the steps of (1) reacting about 40 to 88 percent of a dimerized fatty acid with about 5 to 10 percent of a polyamine in the presence of about 2 to 10 percent of a chain-terminating agent to form a carboxyl-terminated polyamide resin having a molecular weight less than 3000, an acid value of about 35 to 200, and an amine value of about 0 to 10 and (2) reacting said polyamide resin with about 5 to 50 percent of an epoxy resin having the formula

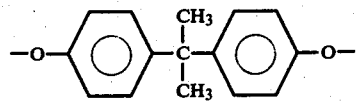

where $R^1$ is a bisphenol A moiety having the structure

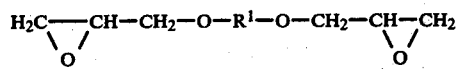

all amounts being based on the weight of the total charge of reactants.

3. The ink of claim 2 wherein the amount of dimerized fatty acid is about 70 to 75 percent, the amount of polyamine is about 6 to 9 percent, the amount of chain-terminating agent is about 4 to 6 percent, and the amount of epoxy resin is about 10 to 20 percent, all amounts being based on the weight of the total charge of reactants, said chain-terminating agent being a monocarboxylic acid.

4. The ink of claim 2 wherein the carboxyl-terminated polyamide resin product of step 1 has an acid value of about 50 to 125 and an amine value of about 0 to 6 and the poly(amide-ester) resin product of step 2 has an acid value of about 0 to 15, an amine value of about 0 to 3, and a softening point of about 85° to 135° C.

5. The ink of claim 2 wherein the dimerized fatty acid consists of about a trace to 15 weight percent of monomer acid, about 60 to 98 weight percent of dimer acid, and about a trace to 25 weight percent of trimer acid.

* * * * *